CONTROL APPARATUS FOR RADIO MONITORING STATION

Filed Nov. 4, 1955 2 Sheets-Sheet 1

INVENTOR
P. YAFFEE

BY

ATTORNEYS

INVENTOR
P. YAFFEE

BY
G. D. O'Brien
W. O. Quesenbery
ATTORNEYS

United States Patent Office 2,900,635
Patented Aug. 18, 1959

2,900,635

CONTROL APPARATUS FOR RADIO MONITORING STATION

Philip Yaffee, Kensington, Md., assignor to the United States of America as represented by the Secretary of the Navy Application November 4, 1955, Serial No. 545,141

5 Claims. (Cl. 343—205)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in radio monitoring stations scanning a predetermined band of frequencies of the radio spectrum for locating a transmitted signal appearing therein, and for holding the scanning receiver on the frequency of the transmitted signal, and more particularly to a radio monitoring station scanning a predetermined band of frequencies for more than one transmission appearing therein.

In systems heretofore designed for monitoring a particular frequency band of the radio spectrum wherein more than one transmission is anticipated, it is customary to utilize several receivers to concurrently scan the frequency band for detection of the several transmissions appearing therein. One operational shortcoming with the multiple receiver station resides in the possibility of the multiple receivers all locking on a single transmitted signal appearing within the band thereby leaving the remainder of the frequency band unmonitored and giving rise to the non-detection of the other anticipated transmissions in the particular frequency band.

It is an object of the present invention to provide an improved apparatus for a monitoring station utilizing multiple scanning receivers for electronically preventing the locking in of more than one receiver on a single transmission signal frequency.

Another object of the present invention is to provide a new and improved control apparatus for temporarily disabling a monitoring receiver from scanning in the proximity of a transmission signal frequency which has been detected by an associated monitoring receiver.

A further object of the present invention is to provide a frequency setting apparatus for accurately setting the frequencies of missile guidance radiosondes.

Other objects and many of the attendant advantages of this invention will be readily appreciated as the same becomes better understood by reference to the following detailed description when considered in connection with the accompanying drawings wherein.

Figure 1:
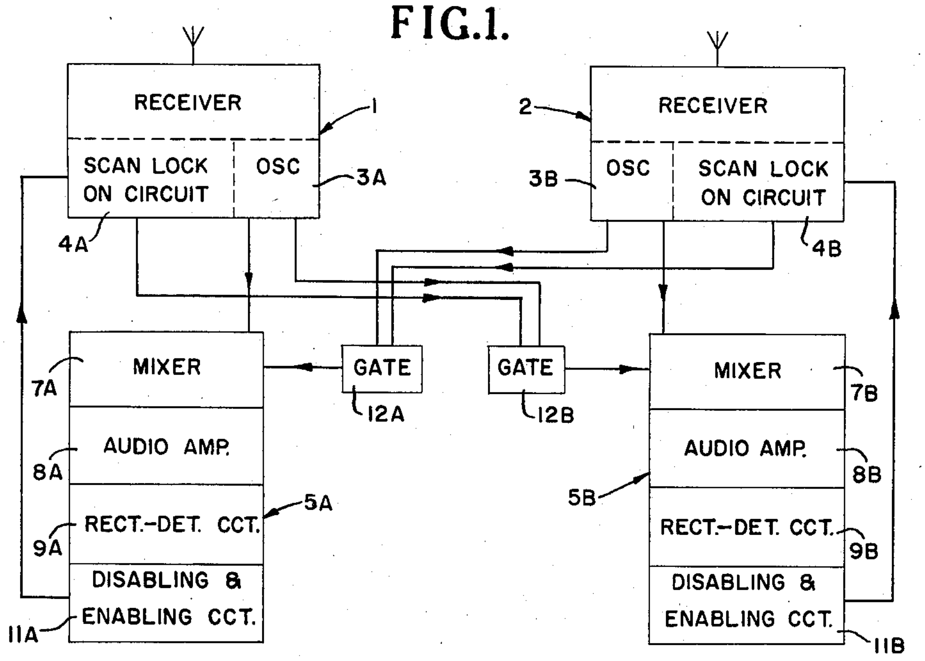
Fig. 1 is a block diagrammatic view on which is shown one embodiment of the subject invention.

Referring now to the drawings wherein like reference numerals indicate like parts throughout the several views and more particularly to Fig. 1 whereon is shown, in block diagram form, the several units comprising the essential elements of one embodiment of the present invention, which include a pair of scanning, or sweeping, superheterodyne receivers, generally indicated by the numerals 1 and 2 respectively. The sweeping superheterodyne receivers may be of the conventional type and include a receiving antenna coupled to a band-pass radio frequency amplifier stage, the output of which is coupled to a mixer circuit wherein it is mixed with the output of an oscillator to produce an intermediate frequency output, which in turn is fed into an intermediate frequency stage and thence to an audio output stage.

To accomplish sweeping the oscillator frequency may be varied, or tuned, over the range of frequencies to be scanned by means of a sweep device, such as a variable condenser in the local oscillator stage of the receiver. To facilitate the monitoring operation, the receiver may include any conventional type of lock-on circuit for electronically disabling the sweep device thereby to hold the receiver tuned to, or on, the frequency of an intercepted signal and to follow it, if necessary. For purposes of explanation of the present invention, the local oscillator and lock-on circuits of each receiver are respectively indicated by the numerals 3A, 3B and 4A, 4B.

Operatively connected to sweep receivers 1 and 2 respectively are receiver control units, generally indicated by the numerals 5A and 5B, respectively. The control units are provided with conventional type mixer circuits 7A and 7B, the outputs of which are respectively fed to conventional type audio frequency amplifiers 8A and 8B. The amplified outputs of the audio amplifiers are respectively introduced into conventional type rectifier-detector circuits 9A and 9B wherein a biasing voltage of a predetermined duration proportional to the amplitudes of the output signals of audio amplifiers 8A and 8B is developed for selectively controlling the operation of conventional type enabling and disabling circuits 11A and 11B. Enabling and disabling circuits 11A and 11B develop output signals which are fed back to the lock-on circuits 4A and 4B of the respective receivers, and control their holding and release operations.

Operatively interconnecting receivers 1 and 2 to control units 5B and 5A, respectively, are electronic gate, or gating, circuits 12A and 12B which gates are normally open, or unoperated, and adaptable to being closed, or operated, by operation of the associated receiver lock-on circuits 4A or 4B when a signal is intercepted by the sweep receiver wherein the lock-on circuit is disposed. Operation of either gate circuit serves to feed the hold-on oscillator frequency of the intercepting receiver to the mixer circuit of the control unit connected to the sweeping receiver wherein the hold-on frequency is mixed with the varying oscillator frequency of the sweeping receiver thereby producing a beat, or intermediate frequency, output signal.

The following operational description is included to more clearly illustrate the operational improvement in monitoring stations resulting from the subject invention. Let it be assumed that scanning receiver 1 has detected a transmitted signal in the monitored frequency band and is locked on the intercepted signal by the operation of scan lock-on circuit 4A. Operation of lock-on circuit 4A closes gate circuit 12B, which circuit is adapted to remain closed during the operation of the lock-on circuit, whereupon the oscillator frequency of oscillator 3A is fed into mixer 7B of receiver 2 control unit 5B at the instant receiver 1 is locked. Inasmuch as the frequency output of oscillator 3B of scanning receiver 2 is continuously being fed into mixer 7B, the oscillator frequencies are mixed to produce a beat frequency output signal which is applied to the input of tuned audio amplifier 8B. The input of audio amplifier 8B is tuned to accept a low audio beat frequency signal from the mixer 7B thereby restricting the output of the amplifier to a period when the oscillator 3B frequency of scanning receiver 2 approaches the frequency of locked oscillator 3A of receiver 1.

Inasmuch as the output of amplifier 8B is fed into rectifier detector 9B for developing a sustained bias voltage to actuate circuit 11B to feed a disabling signal to the lock-on circuit 4B of receiver 2, it is apparent that receiver 2 will not be held on to the transmission signal detected by receiver 1 since audio amplifier 8B will pass a signal to initiate the lock-on disabling operation when receiver 2 is operating in the immediately frequency region of the transmission detected by receiver 1. The bias voltage developed by rectifier detector 9B is prolonged to sustain the disabling operation until the frequency of oscillator 3B has swept by the frequency of locked oscillator 3A, inasmuch as when the two oscillator frequencies are identical a zero beat output is developed in mixer circuit 7B. As oscillator 3B passes through the zero beat point and continues its scan, the beat frequency output of mixer 7B will again increase to the pass band of audio amplifier 8B, whereupon a second output of amplifier 8B is developed to cause rectifier detector circuit 9B to develop a second bias voltage to actuate circuit 11B to feed a second, or enabling signal to lock-on circuit 4B thereby permitting it to be effective should another transmission be detected by receiver 2 in the remainder of the swept band.

It will be noted that although the rectifier-detector circuit 9B has been described as developing a prolonged bias for sustaining the disabling operation, circuit 11B may be readily utilized for this delay purpose, whereupon the bias developed by the rectifier-detector circuit need not be prolonged. In addition, it is to be noted that scan lock-on circuit 4B may readily incorporate a delay circuit for rendering it disabled for the required period of time thereby eliminating the necessity for either of circuits 9B and 11B to develop a prolonged signal or bias voltage.

Figure 2:
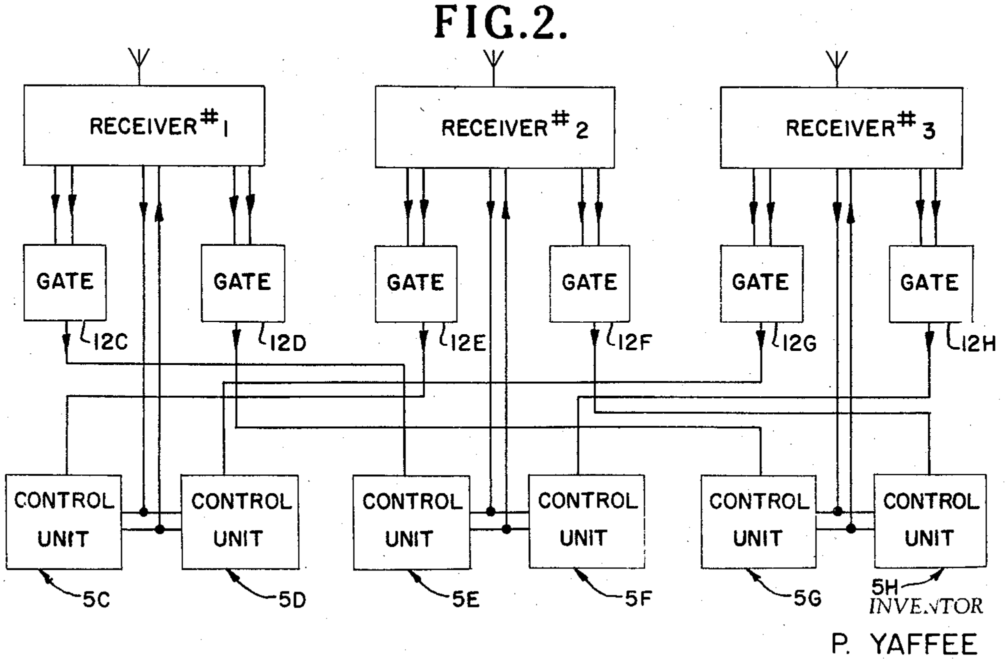
Fig. 2 is a block diagrammatic view generally illustrating the application of the embodiment of the subject invention shown on Fig. 1 to a plurality of scanners in a monitoring station.

It should be understood that, if desired, additional scanning receivers may be employed at the monitoring station utilizing the novel features heretofore disclosed for a pair of scanning receivers without altering the operation of the essential features of the present invention. Fig. 2 illustrates a monitoring station utilizing three scanning receivers with their associated gates and control units, respectively designated as 12C through 12H and 5C through 5H.

Figure 3:
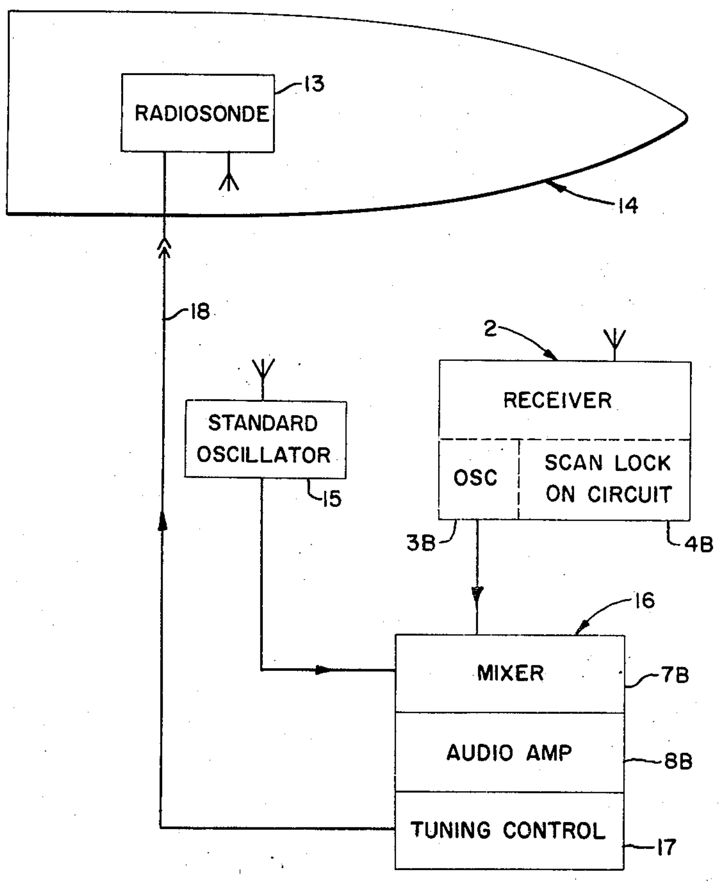
Fig. 3 is a block diagrammatic view illustrating a modified embodiment of the subject invention.

Referring now to Fig. 3 whereon is shown a modified embodiment of the present invention consisting of a remote control frequency setting station for setting the frequency of a guidance radiosonde 13 for a missile, generally indicated by the numeral 14, before launching thereof, standard oscillator 15 is tuned to a desired or preselected radiosonde transmitting frequency and the output thereof fed into the mixer 7B of control unit 16 for scan receiver 2. As the radiosonde 13 is being mechanically tuned toward the desired, or preselected, transmiting frequency as set up on standard oscillator 15, receiver 2 is scanning the frequency band in which the radiosonde is transmitting. Upon interception of the radiosonde transmission, receiver 2 locks on to the transmission signal and follows it. The output of the receiver local oscillator 3B is fed into the mixer 7B where it is mixed with the output of oscillator 15. As the radiosonde is tuned toward the desired frequency, the receiver oscillator frequency approaches that of the standard oscillator and a beat signal output is developed on the mixer circuit 7B. As the beat signal approaches the passband of audio amplifier 8B, a tuning control circuit 17 is actuated whereupon a signal is transmitted through cable 18 for stopping the mechanical tuning operation of the missile radiosonde 13. It is to be understood that although the operation of this control station has been described with reference to a missile radiosonde, other frequency setting applications of the described device will, of course, become evident to those skilled in the art, after understanding the invention.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A signal monitoring station comprising a multiplicity of sweeping receivers receptive to signals within a particular frequency band, circuit means coupled to each of said receivers for developing control signals correlative to the beat signal between the frequency of a signal received by one of said receivers and to the instantaneous sweep frequency of the receivers other than said one receiver, and means responsive to said control signals to render all but said one receiver unaffected by the frequency of said received signal.

2. A radio signal monitoring station comprising a plurality of sweeping radio receiver means receptive to a radio signal within a particular frequency band, each of said receiver means including locking means for interrupting sweeping upon signal reception, circuit means coupled to each of said receiver means for developing a control signal correlative to the difference between the frequency of a radio signal received by one of said receiver means and the instantaneous sweep frequency of the remaining receiver means, and means responsive to said control signal to disable the locking means of all but said one receiver means to the frequency of said received radio signal.

3. A radio station for monitoring signal in a particular radio frequency band comprising a plurality of continuously tunable superheterodyne radio receivers for detecting signals within the particular radio frequency band, each of said receivers including lock-on circuits for suspending further tuning of said receivers upon detection of a signal and for enabling said receivers to follow the detected signal, control circuit means operatively coupled to each of said receivers for developing an electrical signal correlative to the difference frequency between the instantaneous tuned frequency of all but one of said receivers and the frequency of a signal transmission detected by said one receiver, and means responsive to said electrical signal being adapted to render the lock-on circuits of all but said one receiver nonresponsive to the frequency of said detected signal transmission.

4. An electromagnetic wave signal monitoring station comprising a multiplicity of sweeping superheterodyne receivers for intercepting electromagnetic wave signals in a preselected frequency band, each of said receivers having lock-on circuit means for terminating further sweeping upon signal interception by the respective receiver, control circuit means coupled respectively to each of said receivers for producing an electrical control signal correlative to a predetermined frequency difference between the instantaneous oscillator frequency of all but one of said superheterodyne receivers and the oscillator frequency of said one superheterodyne receiver, and means responsive to said electrical control signal being adapted to render the lock-on circuit means of all but said one superheterodyne receiver nonresponsive at the frequency of said intercepted signal, and switching means actuable by the lock-on circuit means of said one superheterodyne receiver for transmitting the oscillator frequency thereof to all but the control circuit means respective to said one receiver.

5. An electromagnetic wave signal monitoring station according to claim 4 wherein said control circuit means includes mixer circuit means for developing an output beat frequency signal proportional to the frequency difference of a pair of frequency signals applied thereto, audio amplifier means for selectively developing an amplified output signal in response to said output beat frequency signal, rectifier detector circuit means for developing a biasing signal proportional to the magnitude of said amplified output signal, and said means responsive to said electrical control signal being selectively responsive to said biasing signal for rendering said lock-on circuit means intermittently nonresponsive.

References Cited in the file of this patent

UNITED STATES PATENTS

| | | |
|---|---|---|
| 2,064,905 | Green | Dec. 22, 1936 |
| 2,376,667 | Cunningham et al. | May 22, 1945 |
| 2,378,604 | Wallace | June 19, 1945 |
| 2,417,191 | Fox | Mar. 11, 1947 |
| 2,639,372 | Colgan | May 19, 1953 |
| 2,640,150 | Wu | May 26, 1953 |
| 2,690,506 | Jenkens | Sept. 28, 1954 |
| 2,727,139 | Hollandbeck | Dec. 13, 1955 |
| 2,825,804 | Rug | Mar. 4, 1958 |